United States Patent
Wang

(10) Patent No.: US 7,619,952 B2
(45) Date of Patent: Nov. 17, 2009

(54) TRACK CALCULATION METHOD FOR FIXING TRACK JUMPS OF OPTICAL DISCS OF DIFFERENT CAPACITIES

(75) Inventor: Liang-Yen Wang, Taipei (TW)

(73) Assignee: ALI Corporation, Taipei (TW)

( * ) Notice: Subject to any disclaimer, the term of this patent is extended or adjusted under 35 U.S.C. 154(b) by 77 days.

(21) Appl. No.: 12/057,390

(22) Filed: Mar. 28, 2008

(65) Prior Publication Data

US 2009/0213703 A1   Aug. 27, 2009

(30) Foreign Application Priority Data

Feb. 22, 2008   (CN) .................. 2008 1 0080559

(51) Int. Cl.
G11B 7/00   (2006.01)

(52) U.S. Cl. .................. 369/44.28; 369/30.15

(58) Field of Classification Search ............. 369/44.28, 369/44.25, 44.29, 44.34, 44.27, 30.15

See application file for complete search history.

(56) References Cited

U.S. PATENT DOCUMENTS 5,875,161 A * 2/1999 Takegawa ................. 369/44.28

* cited by examiner

Primary Examiner—Ali Neyzari
(74) Attorney, Agent, or Firm—Winston Hsu

(57) ABSTRACT

An appropriate track calculation equation is inducted according to a relationship between a storage area and a track pitch of a compact disc, and a pickup unit is instantly shifted to a location calculated with the track calculation equation. Therefore, an error after performing a track jump modulation is reduced to a smallest degree, and in other words, the pickup unit may access a location on the disc currently required by a user without frequent or time-consuming long seeks. As a result, when the pickup unit accesses compact discs having unknown formats, which indicate different capacities or properties, a track error may be calculated in a shortest time so as to shift the pickup unit accordingly and to fix track jumps, and the user may browse any location on the compact discs having unknown formats smoothly.

15 Claims, 2 Drawing Sheets

TRACK CALCULATION METHOD FOR FIXING TRACK JUMPS OF OPTICAL DISCS OF DIFFERENT CAPACITIES

BACKGROUND OF THE INVENTION

1. Field of the Invention

The present invention relates to a track calculation method, and more particularly, to a track calculation method for fixing track jumps of optical discs of different capacities.

2. Description of the Prior Art

Popular optical discs have different capacities so that the optical discs may be classified into normal optical discs and compression optical discs. A compression optical disc is an optical disc storing data in a compressed manner. For example, a track density of a conventional optical disc is raised for raising a capacity of the conventional optical disc so that said conventional optical disc is fabricated as a compression optical disc. A primary characteristic of a compression disc lies in the fact that a track pitch of the compression optical disc is shorter than a track pitch of a conventional optical disc. Moreover, a length of the track pitch of the compression optical disc may be varied corresponding to different compression techniques.

Take video optical discs as examples. Since a conventional optical disc driver is designed for accessing a normal video optical disc, which stores data in an un-compressed manner, and since properties of a compression video optical disc, such as a number of tracks or a length of track pitch, are far from those of a normal video optical disc, when the conventional optical disc driver tries to access a compression optical disc and performs track jumps for accessing arbitrary video sectors on the compression optical disc, a large number of calculation errors result. Therefore, as a result, more track jumps are required, and more time is consumed on seeks between tracks. In other words, a distance on the compression video optical disc between a current location of a pickup unit of the conventional optical disc driver and a designated location of a user is getting broader as well after a track jump is performed. For a user who gets used to the track jump function of the conventional optical disc driver for browsing videos of arbitrary times on a same compression video optical disc, time-consuming or frequent track jumps may bring inconveniences to the user. Besides, properties, which include a capacity, a track pitch, a number of tracks, are varied corresponding to different compression optical discs. Therefore, when a conventional optical disc driver performs track jumps on the different compression optical discs, the frequency and the duration of track jumps are harder to be predicted.

SUMMARY OF THE INVENTION

The claimed invention discloses a track calculation method for fixing track jumps of optical discs of different capacities. The method comprising calculating a first track jump coefficient $K_1$ and a second track jump coefficient $K_2$ according to a first equation; calculating an amendment ratio according to an initial location and a target location, both of which correspond to the capacity of the optical disc; updating both the first track jump coefficient $K_1$ and the second track jump coefficient $K_2$ according to the amendment ratio; determining a track displacement according to both the updated first track jump coefficient $K_1$ and second track jump coefficient $K_2$; and moving a pickup unit utilized for accessing the optical disc according to the determined track displacement. The first equation is indicated as $$TotalTracks = (K_2 + K_1 \times t_{end})^{\frac{1}{2}} - (K_2 + K_1 \times t_{start})^{\frac{1}{2}}.$$

TotalTracks indicates a total number of tracks corresponding to a capacity of an optical disc. $t_{start}$ indicates a starting time of playing the optical disc. $t_{end}$ indicates an ending time of playing the optical disc. The first track jump coefficient $K_1$ is indicated as:

$$K_1 = \frac{r_{max}^2 - r_{min}^2}{t_p^2 \times t_l}.$$

The second track jump coefficient $K_2$ is indicated as:

$$K_2 = \left(\frac{r_{min}}{t_p}\right)^2 \cdot r_{max}$$

indicates a maximal radius corresponding to the capacity of the optical disc. $r_{min}$ indicates a minimal radius corresponding to the capacity of the optical disc. $t_p$ indicates a track pitch of the optical disc. $t_l$ indicates a time difference between the starting time and the ending time of playing the optical disc.

A track calculation method for fixing track jumps of optical discs of different capacities is disclosed. The method comprises calculating a first track jump coefficient and a second track jump coefficient according to a first equation; calculating an amendment ratio according to an initial location and a target location, both of which correspond to a capacity of the optical disc; updating both the first track jump coefficient and the second track jump coefficient according to the amendment ratio; determining a track displacement according to both the updated first track jump coefficient and second track jump coefficient; and moving a pickup unit utilized for accessing the optical disc according to the track displacement.

These and other objectives of the present invention will no doubt become obvious to those of ordinary skill in the art after reading the following detailed description of the preferred embodiment that is illustrated in the various figures and drawings.

DETAILED DESCRIPTION

For solving the defect of inaccurate track calculations related to track jumps while the abovementioned conventional optical disc driver accesses a compression optical disc and performs the track jumps, a track calculation method for fixing track jumps of optical discs of different capacities is disclosed in the present invention. With the disclosure of the track calculation method of the present invention, a time of completing an entire track jump is shortened to a smallest degree, which is more significant when long track jumps (or long seeks) are performed. Note that the optical discs mentioned herein include compression optical discs. Primary characteristics of the track calculation method of the present invention include inducting adequate track calculation equations according to relationships between a track pitch and a storage area of an optical disc, and moving a pickup unit of the optical disc driver to a location on the optical disc calculated according to the inducted track calculation equations instantly. Therefore, an error of performing track jumps is reduced to a smallest degree so that less frequent or less time-consuming track jumps are retrieved for instantly moving the pickup unit to a desired location of the user at anytime.

Figure 1:
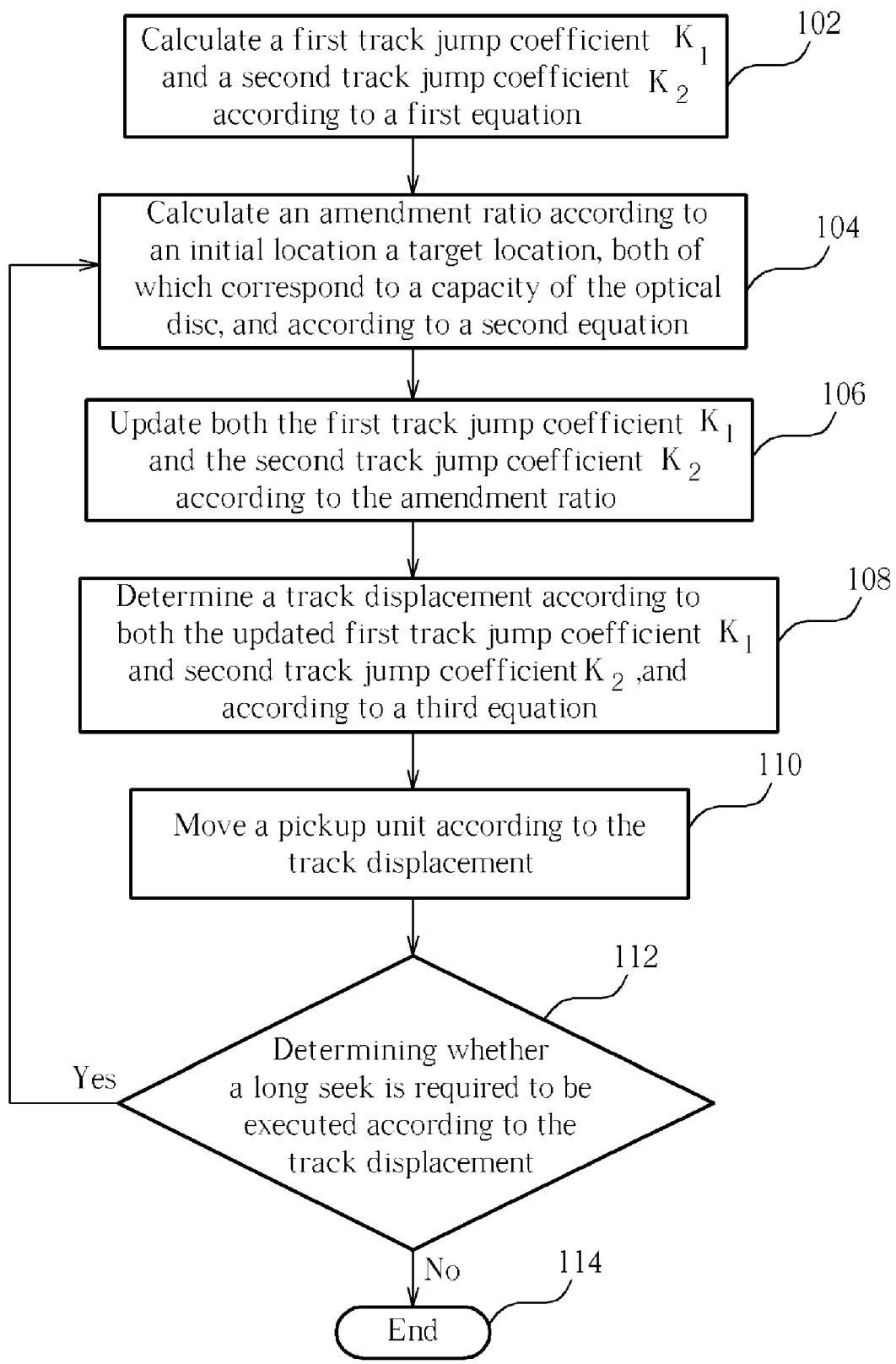
FIG. 1 is a flowchart of the track calculation method of fixing track jumps of optical discs having different capacities in the present invention.

Please refer to FIG. 1, which is a flowchart of the track calculation method of fixing track jumps of optical discs having different capacities in the present invention. As shown in FIG. 1, the track calculation method of the present invention includes steps as follows:

Step 102: Calculate a first track jump coefficient $K_1$ and a second track jump coefficient $K_2$ according to a first equation;

Step 104: Calculate an amendment ratio according to an initial location and a target location, both of which correspond to a capacity of the optical disc, and according to a second equation;

Step 106: Update both the first track jump coefficient $K_1$ and the second track jump coefficient $K_2$ according to the amendment ratio;

Step 108: Determine a track displacement according to both the updated first track jump coefficient $K_1$ and second track jump coefficient $K_2$, and according to a third equation;

Step 110: Move a pickup unit utilized for accessing the optical disc according to the track displacement;

Step 112: Determining whether a long seek is required to be executed according to the track displacement; while the long seek is required to be executed, go to Step 104; else, go to Step 114; and Step 114: End.

Figure 2:
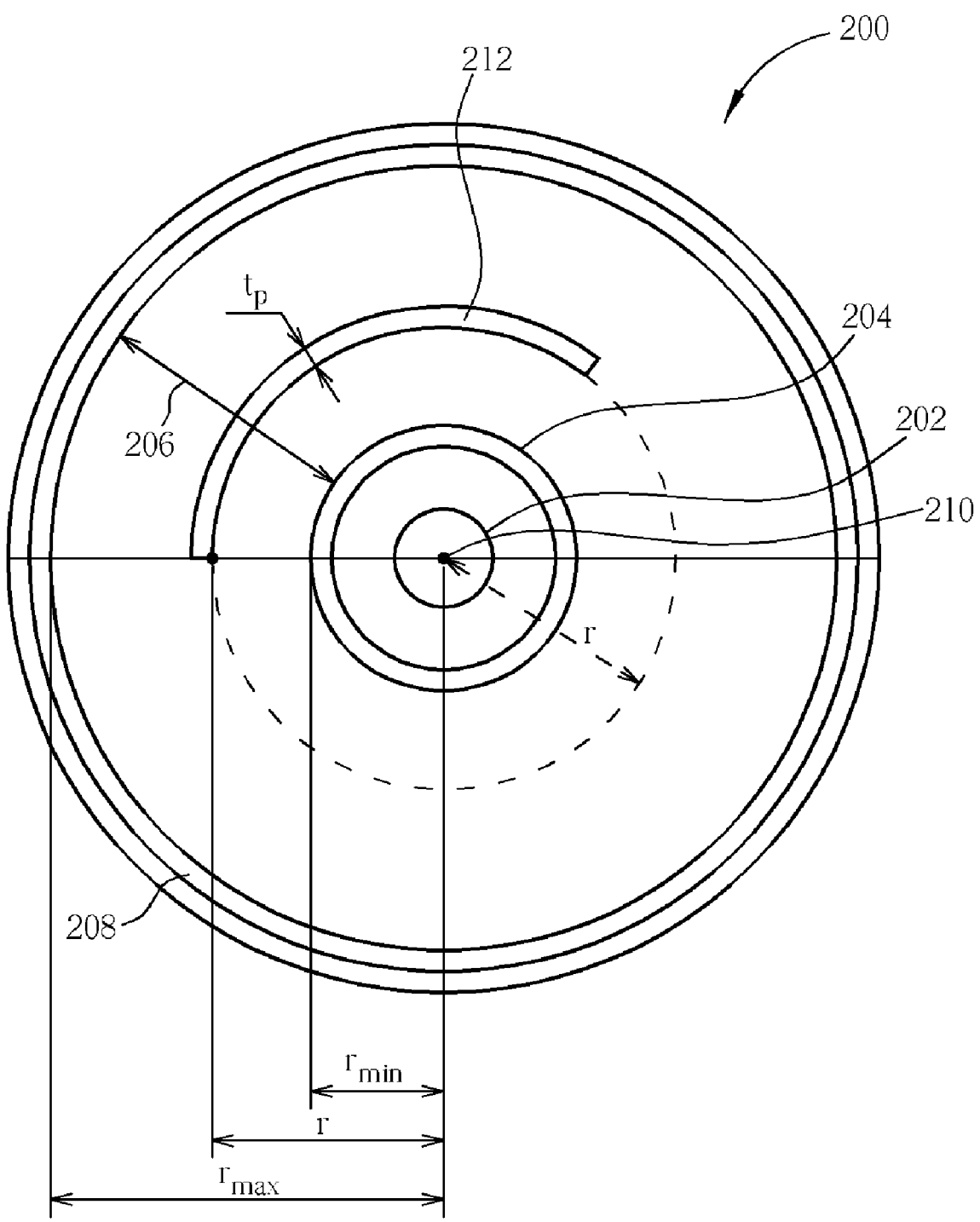
FIG. 2 illustrates an optical disc used in FIG. 1, where the track calculation method disclosed in FIG. 1 uses certain coefficients related to the optical disc.

Please refer to both FIG. 1 and FIG. 2. FIG. 2 illustrates an optical disc 200 used in FIG. 1, where the track calculation method disclosed in FIG. 1 uses certain coefficients related to the optical disc 200. Note that following descriptions about both FIG. 1 and FIG. 2 are based on an assumption that the optical disc 200 is a playable video optical disc. However, applying the track calculation method of the present invention on optical discs other than a video optical disc or on various types of compression optical discs should not be limitations of the present invention. As shown in FIG. 2, the optical disc 200 includes a center hole 202, a lead-in area 204, a program area 206, and a lead-out area 208. A center 210 of the center hole 202 lies on a geometric center of the optical disc 200. In a conventional optical disc, a region is specifically programmed for storing data, i.e., the program area 206. Accurate numbers of tracks after performing track jumps are calculated according to a capacity and related coefficients of the program area 206 in the disclosed track calculation method of the present invention. Descriptions of steps disclosed in FIG. 1 are performed on a location 212 within the program area 206. The coefficient $r_{min}$ indicates a shortest radius of the program area 206, where the shortest radius $r_{min}$ is centered at the center 210 and corresponds to the optical disc 200. Similarly, the coefficient $r_{max}$ indicates a longest radius of the program area 206, where the longest radius $r_{max}$ is also centered at the center 210 and corresponds to the optical disc 200. The coefficient r indicates a radius of the location 212, where the radius r is centered at the center 210 and corresponds to the optical disc 200. A width $t_p$ of the location 212 indicates a track pitch of the optical disc 200.

The first equation described in Step 102 is indicated as:

$$TotalTracks = (K_2 + K_1 \times t_{end})^{\frac{1}{2}} - (K_2 + K_1 \times t_{start})^{\frac{1}{2}} \quad (1)$$

TotalTracks indicates a total track number on the program area 206. $t_{start}$ indicates an initial time of playing the program area 206 on the optical disc 200, and corresponds to the shortest radius $r_{min}$ of the program area 206. Similarly, $t_{end}$ indicates a target time of playing the program 206 on the optical disc 200, and corresponds to the longest radius $r_{max}$ of the program area 206. The first track jump coefficient $K_1$ is indicated as:

$$K_1 = \frac{r_{max}^2 - r_{min}^2}{t_p^2 \times t_l} \quad (2)$$

The second track jump coefficient $K_2$ is indicated as:

$$K_2 = \left(\frac{r_{min}}{t_p}\right)^2 \quad (3)$$

$t_l$ indicates a time difference between the initial time $t_{start}$ and the target time $t_{end}$ of playing the program area 206 on the optical disc 200, and corresponds to a length difference between the longest radius $r_{max}$ and the shortest radius $r_{min}$ of the program area 206.

The equations (1), (2), and (3) are inducted according to relationships between the program area 206 and the track pitch $t_p$. And both the equations (2) and (3) are inducted from the equation (1). Related inductions are described as follows. First, since an area surrounded between a first circle and a second circle on the optical disc 200 is directly proportional to a time difference between a current location and the initial location of playing videos on the program area 206, an equation may be inducted as:

$$\frac{r^2 - r_{min}^2}{r_{max}^2 - r_{min}^2} = \frac{t}{t_l} \quad (4)$$

Note that the first circle is the circle including the location 212 on its periphery, and the second circle is formed corresponding to the shortest radius $r_{min}$ of the program area 206. t is the time difference between the current location and the initial location of playing videos on the program area 206. Besides, since the radius r corresponding to the location 212, the shortest radius $r_{min}$ corresponding to the program area 206, and the track pitch $t_p$ have been known, a number tracks of tracks occupied by the location 212 may be inducted as:

$$tracks = \frac{r - r_{min}}{t_p} \quad (5)$$

By substitutions between the equations (4) and (5), another equation may be inducted as:

$$\frac{(t_p \times \text{tracks} + r_{min})^2 - r_{min}^2}{r_{max}^2 - r_{min}^2} = \frac{t}{t_l} \quad (6)$$

By rearranging the equation (6), the number tracks of tracks may be indicated in detail as:

$$\text{tracks} = \frac{1}{t_p} \times \left\{ \left[ \frac{t}{t_l} \times (r_{max}^2 - r_{min}^2) + r_{min}^2 \right]^{\frac{1}{2}} - r_{min} \right\} \quad (7)$$

Assume there are a first sector and a second sector occupying different locations on the program area 206 on the optical disc 200, assume $t_1$ indicates a time difference between the first sector and the initial location of playing videos on the program area 206, and assume $t_2$ indicates a time difference between the second sector and the initial location of playing videos on the program area 206. Therefore, according to the equation (7), both numbers of tracks of the first sector and the second sector on the program area 206 are retrieved, and moreover, a track difference Δtracks of track numbers between the first sector and the second sector is also retrieved. The track difference Δtracks may be indicated as follows:

$$\Delta\text{tracks} = \frac{1}{t_p} \left\{ \left[ \left\{ \frac{t_2}{t_l} \right\} (r_{max}^2 - r_{min}^2) + r_{min}^2 \right]^{\frac{1}{2}} - \right. \quad (8)$$
$$\left. \left[ \left\{ \frac{t_1}{t_l} \right\} (r_{max}^2 - r_{min}^2) + r_{min}^2 \right]^{\frac{1}{2}} \right\}$$
$$= \left[ \left( \frac{r_{min}}{t_p} \right)^2 + \left( \frac{r_{max}^2 - r_{min}^2}{t_p^2 \times t_l} \right) \times t_2 \right]^{\frac{1}{2}} -$$
$$\left[ \left( \frac{r_{min}}{t_p} \right)^2 + \left( \frac{r_{max}^2 - r_{min}^2}{t_p^2 \times t_l} \right) \times t_1 \right]^{\frac{1}{2}}$$
$$= [K_2 + K_1 \times t_2]^{\frac{1}{2}} - [K_2 + K_1 \times t_1]^{\frac{1}{2}}$$

Since the value of the time difference $t_1$ may be larger than, equal to, or less than the value of the time difference $t_2$, for ensuring that the value of the track difference Δtracks must be positive, the equation (8) may be rewritten according to an absolute value of the track difference Δtracks:

$$\Delta\text{tracks} = \left| \left[ \left( \frac{r_{min}}{t_p} \right)^2 + \left( \frac{r_{max}^2 - r_{min}^2}{t_p^2 \times t_l} \right) \times t_2 \right]^{\frac{1}{2}} - \right. \quad (9)$$
$$\left. \left[ \left( \frac{r_{min}}{t_p} \right)^2 + \left( \frac{r_{max}^2 - r_{min}^2}{t_p^2 \times t_l} \right) \times t_1 \right]^{\frac{1}{2}} \right|$$
$$= \left| [K_2 + K_1 \times t_2]^{\frac{1}{2}} - [K_2 + K_1 \times t_1]^{\frac{1}{2}} \right|$$

With the aid of the equation (9), as long as both a target location and a current location of the pickup unit are known, a currently required track difference for fixing the track jump may be directly retrieved. Note that the target location of the pickup unit refers to a currently-designated time of the user, for example, the time difference $t_2$, after videos on the program area 206 are played at the initial location. Note that the current location of the pickup unit refers to a currently-located time of the pickup unit, for example, the time difference $t_1$, after videos on the program area 206 are played at the initial location.

While the track calculation method of the present invention is formally applied on an optical disc having known specifications or a compression optical disc, values of both the first track jump coefficient $K_1$ and the second track jump coefficient $K_2$ are retrieved according to the abovementioned coefficients related to a conventional optical disc in Step 102, and then both the first track jump coefficient $K_1$ and the second track jump coefficient $K_2$ are amended corresponding to the optical disc having unknown specifications in Step 104, where the amendment indicates substituting an initial location and a target location of the program area 206 of the optical disc having unknown specifications, and a current-located location of the pickup unit, into a second equation to calculate an amendment ratio. In Step 106, the calculated amendment ratio is used for updating values of both the first track jump coefficient $K_1$ and the second track jump coefficient $K_2$. The second equation is indicated as:

$$\text{ratio} = \frac{CurrentLocation - InitialLocation}{TargetLocation - InitialLocation} \quad (10)$$

ratio indicates a value of the amendment ratio. InitialLocation indicates the initial location of the program area 206 of the optical disc having unknown specifications. TargetLocation indicates the target location of the program area 206 of the optical disc having unknown specifications. CurrentLocation indicates the current-loaded location of the pickup unit. Note that units of the locations listed in the equation (10) are conventionally represented in a form of (minute, second, frame). In Step 106, values of both the first track jump coefficient $K_1$ and the second track jump coefficient $K_2$ are multiplied with $$\frac{1}{\text{ratio}^2}$$

so as to be updated. In Step 108, both the updated first track jump coefficient $K_1$ and the updated second track jump coefficient $K_2$, a to-be-played location on the optical disc having unknown specifications as the time $t_1$ (for example), and a currently-loaded location of the pickup unit as the time $t_2$ (for example), are substituted into the equation (9) to calculate a track difference between locations respectively indicated by the times $t_1$ and $t_2$. In Step 110, the pickup unit is moved according to the calculated track difference in Step 108 so as to fix track jumps at a first time.

In most experiments of embodiments of the present invention, at this time, the currently-loaded location is physically and extremely close to the to-be-played location on the optical disc having unknown specifications, and therefore, a physically-remaining track difference between the currently-loaded location and the to-be-played location is likely to be short enough, i.e., a long seek is not required to be executed at this time. However, under few certain circumstances, the physically-remaining track difference may still be fixed (or shortened) by executing a long seek. In other words, at this time, the track jump has to be fixed at a second time. Therefore, in Step 112, while an additional long seek is still required to be executed, the Step 104 is performed repeatedly to perform track calculation at a second time; and as a result, when the Step 112 is run at a second time, the physically remaining difference at this time is used for determining whether a still additional long seek is required to be performed to initiate a third time of fixing the track jump or ending the procedure of fixing the track jump. According to most experimental data, an extremely high ratio of the track jump fixing procedure is not repeated more than twice to have the physically-remaining track difference be short enough. As a result, the track jump fixing procedure according to embodiments of the present invention may be completed in a significantly-short time since a time of performing long seeks is reduced significantly as well. And moreover, a user may arbitrarily and smoothly browse videos on the optical disc having unknown specifications at any locations.

A track calculation method is disclosed in the present invention for calculating a track difference in a shortest time, for moving a pickup unit of an optical disc driver according to the calculated track difference, and for fixing track jumps thereby, while the pickup unit accesses optical discs having different capacities or having different unknown specifications. With the aid of the disclosed method of the present invention, frequent and time-consuming long seeks may be avoided so that a time of fixing track jumps is also shortened significantly. Thereby, a user may arbitrarily and smoothly browse any locations on the optical discs having unknown specifications.

Those skilled in the art will readily observe that numerous modifications and alterations of the device and method may be made while retaining the teachings of the invention.

What is claimed is:

1. A track calculation method for fixing track jumps of optical discs of different capacities, the method comprising:

calculating a first track jump coefficient $K_1$ and a second track jump coefficient $K_2$ according to a first equation, wherein the first equation is indicated as:

$$TotalTracks = (K_2 + K_1 \times t_{end})^{\frac{1}{2}} - (K_2 + K_1 \times t_{start})^{\frac{1}{2}};$$

wherein TotalTracks indicates a total number of tracks corresponding to a capacity of an optical disc, $t_{start}$ indicates a starting time of playing the optical disc, and $t_{end}$ indicates an ending time of playing the optical disc;

wherein the first track jump coefficient $K_1$ is indicated as:

$$K_1 = \frac{r_{max}^2 - r_{min}^2}{t_p^2 \times t_l},$$

and the second track jump coefficient $K_2$ is indicated as:

$$K_2 = \left(\frac{r_{min}}{t_p}\right)^2;$$

wherein $r_{max}$ indicates a maximal radius corresponding to the capacity of the optical disc, $r_{min}$ indicates a minimal radius corresponding to the capacity of the optical disc; $t_p$ indicates a track pitch of the optical disc, and $t_l$ indicates a time difference between the starting time and the ending time of playing the optical disc;

calculating an amendment ratio according to an initial location and a target location, both of which correspond to the capacity of the optical disc;

updating both the first track jump coefficient $K_1$ and the second track jump coefficient $K_2$ according to the amendment ratio;

determining a track displacement according to both the updated first track jump coefficient $K_1$ and second track jump coefficient $K_2$; and moving a pickup unit utilized for accessing the optical disc according to the determined track displacement.

2. The method of claim 1 wherein calculating the amendment ratio according to the initial location and the target location comprises:

calculating the amendment ratio according to a second equation, which is indicated as:

$$ratio = \frac{CurrentLocation - InitialLocation}{TargetLocation - InitialLocation};$$

wherein ratio indicates the amendment ratio, InitialLocation indicates the initial location, TargetLocation indicates the target location, and CurrentLocation indicates a current-played location of the optical disc.

3. The method of claim 1 wherein updating both the first track jump coefficient $K_1$ and the second track jump coefficient $K_2$ according to the amendment ratio comprises:

multiplying the first track jump coefficient $K_1$ with $$\frac{1}{ratio^2};$$

and multiplying the second track jump coefficient $K_2$ with $$\frac{1}{ratio^2};$$

wherein ratio indicates the amendment ratio.

4. The method of claim 1 wherein determining the track displacement according to both the updated first track jump coefficient $K_1$ and second track jump coefficient $K_2$ comprises:

determining the track displacement according to a third equation, which is indicated as:

$$\Delta tracks = \left|(K_2 + K_1 \times t_2)^{\frac{1}{2}} - (K_2 + K_1 \times t_1)^{\frac{1}{2}}\right|;$$

wherein $\Delta$tracks indicates the track displacement, $t_2$ indicates a predetermined time in playing the optical disc, and $t_1$ indicates a current time in playing the optical disc.

5. The method of claim 1 further comprising:

determining whether a long seek is required to be executed according to the track displacement.

6. The method of claim 5 further comprising:
updating the amendment ratio while the long seek is required to be executed;
updating both the first track jump coefficient $K_1$ and the second track jump coefficient $K_2$ according to the updated amendment ratio;
determining a new track displacement according to both the updated first track jump coefficient $K_1$ and second track jump coefficient $K_2$; and
determining whether the long seek is required to be executed again according to the newly-determined track displacement.

7. The method of claim 6 wherein updating the amendment ratio while the long seek is required to be executed comprises:
calculating the amendment ratio according to a second equation, which is indicated as:

$$\text{ratio} = \frac{CurrentLocation - InitialLocation}{TargetLocation - InitialLocation};$$

wherein ratio indicates the amendment ratio, InitialLocation indicates the initial location, TargetLocation indicates the target location, and CurrentLocation indicates a current-played location of the optical disc.

8. The method of claim 6 wherein updating both the first track jump coefficient $K_1$ and the second track jump coefficient $K_2$ according to the updated amendment ratio comprises:
multiplying the first track jump coefficient $K_1$ with $$\frac{1}{ratio^2};$$

and
multiplying the second track jump coefficient $K_2$ with $$\frac{1}{ratio^2};$$

wherein ratio indicates the amendment ratio.

9. The method of claim 6 wherein determining the track displacement according to both the updated first track jump coefficient $K_1$ and second track jump coefficient $K_2$ comprises:
determining the track displacement according to a third equation, which is indicated as:

$$\Delta tracks = \left| (K_2 + K_1 \times t_2)^{\frac{1}{2}} - (K_2 + K_1 \times t_1)^{\frac{1}{2}} \right|;$$

wherein $\Delta tracks$ indicates the track displacement, $t_2$ indicates a predetermined time in playing the optical disc, and $t_1$ indicates a current time in playing the optical disc.

10. A track calculation method for fixing track jumps of optical discs of different capacities, the method comprising:
calculating a first track jump coefficient and a second track jump coefficient according to a first equation;
calculating an amendment ratio according to an initial location and a target location, both of which correspond to a capacity of the optical disc;
updating both the first track jump coefficient and the second track jump coefficient according to the amendment ratio;
determining a track displacement according to both the updated first track jump coefficient and second track jump coefficient; and
moving a pickup unit utilized for accessing the optical disc according to the track displacement.

11. The method of claim 10 wherein calculating the amendment ratio according to the initial location and the target location comprises:
calculating the amendment ratio according to a second equation;
wherein input variables of the second equation include the initial location, the target location, and a currently-played location on the optical disc.

12. The method of claim 10 wherein determining the track displacement according to both the updated first track jump coefficient and second track jump coefficient comprises:
determining the track displacement according to a third equation;
wherein input variables of the third equation include both the updated first track jump coefficient and second track jump coefficient, a predetermined time of playing the optical disc, and a currently-played location on the optical disc.

13. The method of claim 10 further comprising:
determining whether a long seek is required to be executed according to the track displacement;
moving a pickup unit utilized for accessing the optical disc according to the track displacement while the long seek is not required to be executed;
updating the amendment ratio while the long seek is required to be executed;
updating both the first track jump coefficient and the second track jump coefficient according to the updated amendment ratio;
determining a track displacement according to both the updated first track jump coefficient and second track jump coefficient; and
repeating determining whether the long seek is required to be executed again according to the determined track displacement.

14. The method of claim 13 wherein updating the amendment ratio while the long seek is required to be executed comprises:
calculating the amendment ratio according to a second equation;
wherein input variables of the second equation include the initial location, the target location, and a currently-played location on the optical disc.

15. The method of claim 13 wherein determining the track displacement according to both the updated first track jump coefficient and second track jump coefficient comprises:
determining the track displacement according to a third equation;
wherein input variables of the third equation include both the updated first track jump coefficient and second track jump coefficient, a predetermined time in playing the optical disc, and a current-played time of the optical disc.

* * * * *